United States Patent [19]

Kramer et al.

[11] Patent Number: 5,431,254
[45] Date of Patent: Jul. 11, 1995

[54] SELF-LOCKING BRAKE FOR PORTABLE STAND

[76] Inventors: Bernard L. Kramer, 544 S. 72nd St., Mesa, Ariz. 85208; Theodore B. Kramer, 1762 S. Westwood, Mesa, Ariz. 85210; Mark J. Kramer, 544 S. 72nd St., Mesa, Ariz. 85208

[21] Appl. No.: 55,746

[22] Filed: May 3, 1993

[51] Int. Cl.⁶ ............................ B60T 1/14; B62B 5/04
[52] U.S. Cl. .................................... 188/7; 188/19; 280/43.22; 280/43.24
[58] Field of Search .......................... 188/5-7, 188/19, 23; 280/766.1, 767, 43.22, 43.24, 764.1, 765.1; 254/45; 312/249.8; 248/129; 16/32, 33

[56] References Cited

U.S. PATENT DOCUMENTS

| | | | |
|---|---|---|---|
| 1,155,606 | 10/1915 | Neller | 16/33 |
| 1,626,819 | 5/1927 | Hazlett | 188/7 X |
| 2,360,874 | 10/1944 | Herold | 188/5 |
| 2,458,226 | 1/1949 | Ulrich | 188/5 |
| 2,712,366 | 7/1955 | Skupas | 188/5 |
| 3,727,903 | 4/1973 | Brown | 280/43.24 X |
| 3,735,841 | 5/1973 | Auriemma | 188/5 |
| 4,747,180 | 5/1988 | Screen | 16/33 X |
| 4,930,937 | 6/1990 | Fulton | 16/32 X |
| 5,035,445 | 7/1991 | Poulin | 188/5 X |

FOREIGN PATENT DOCUMENTS 1517718  3/1968  France ............................ 188/5

Primary Examiner—Robert J. Oberleitner
Assistant Examiner—Alfred Muratori
Attorney, Agent, or Firm—Cahill, Sutton & Thomas

[57] ABSTRACT

A brake for a portable stand includes a bracket for attaching the brake to the stand, a sleeve attached to one edge of the bracket, and a plunger movable within the sleeve. A toggle joint, connected between the bracket and one end of the plunger, has a pivot plate as one arm of the toggle joint and a handle attached to the pivot plate for extending and retracting the plunger. A foot attached to the free end of the plunger is either a friction pad or a caster and is attached to the plunger by a leveling screw. The edge of the bracket includes a recess for receiving the toggle joint in an over-center position.

11 Claims, 2 Drawing Sheets

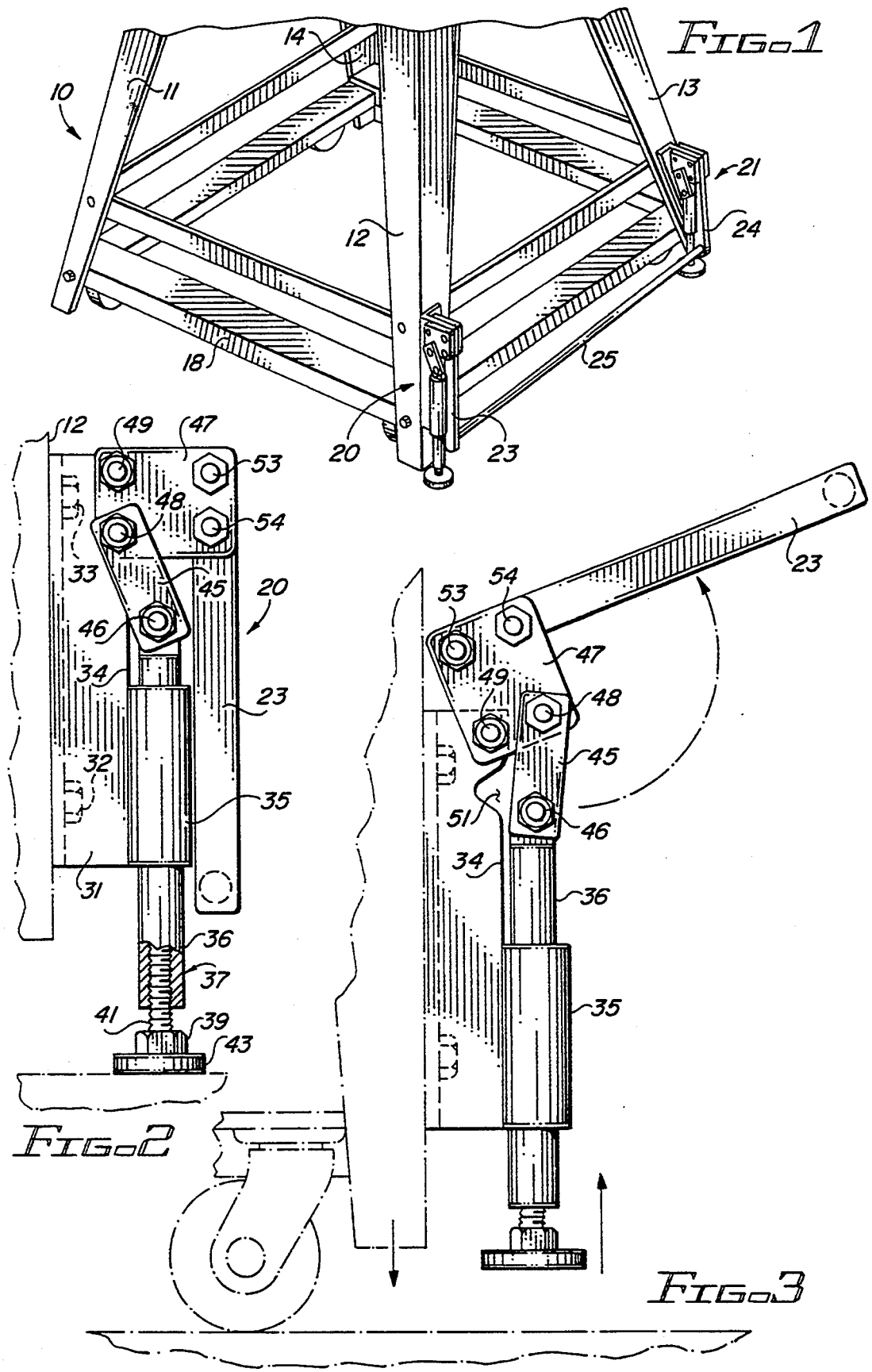

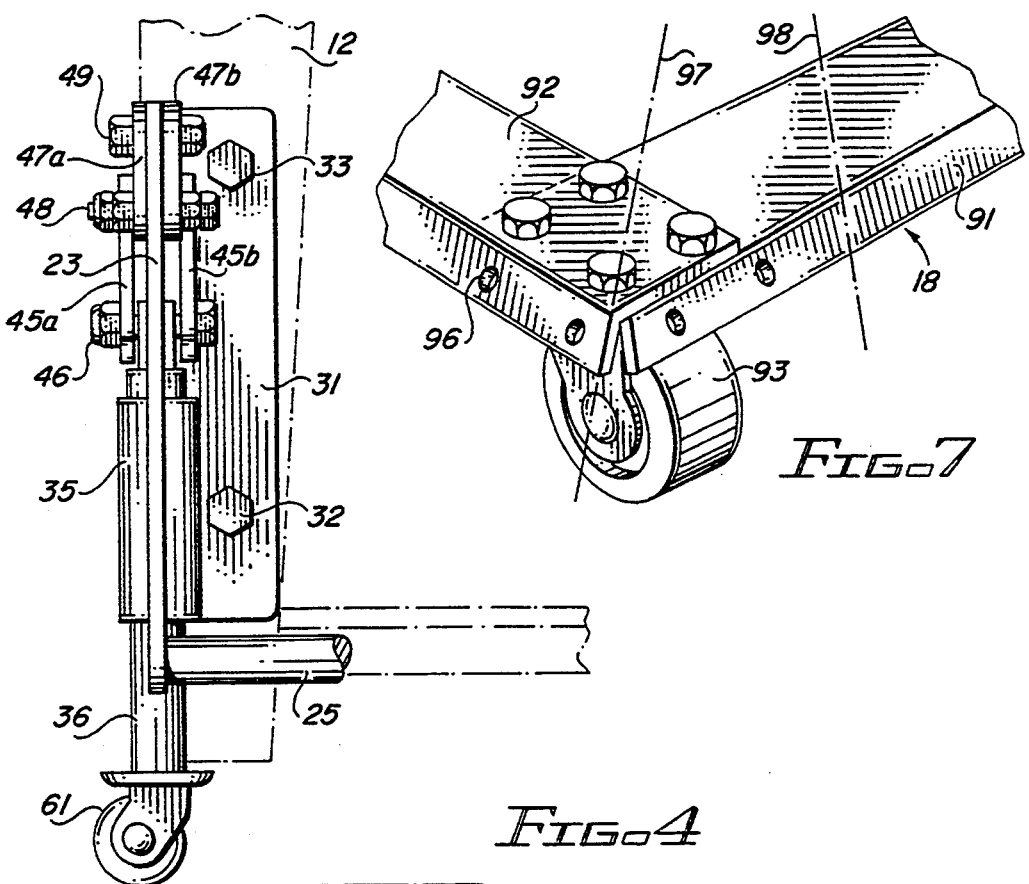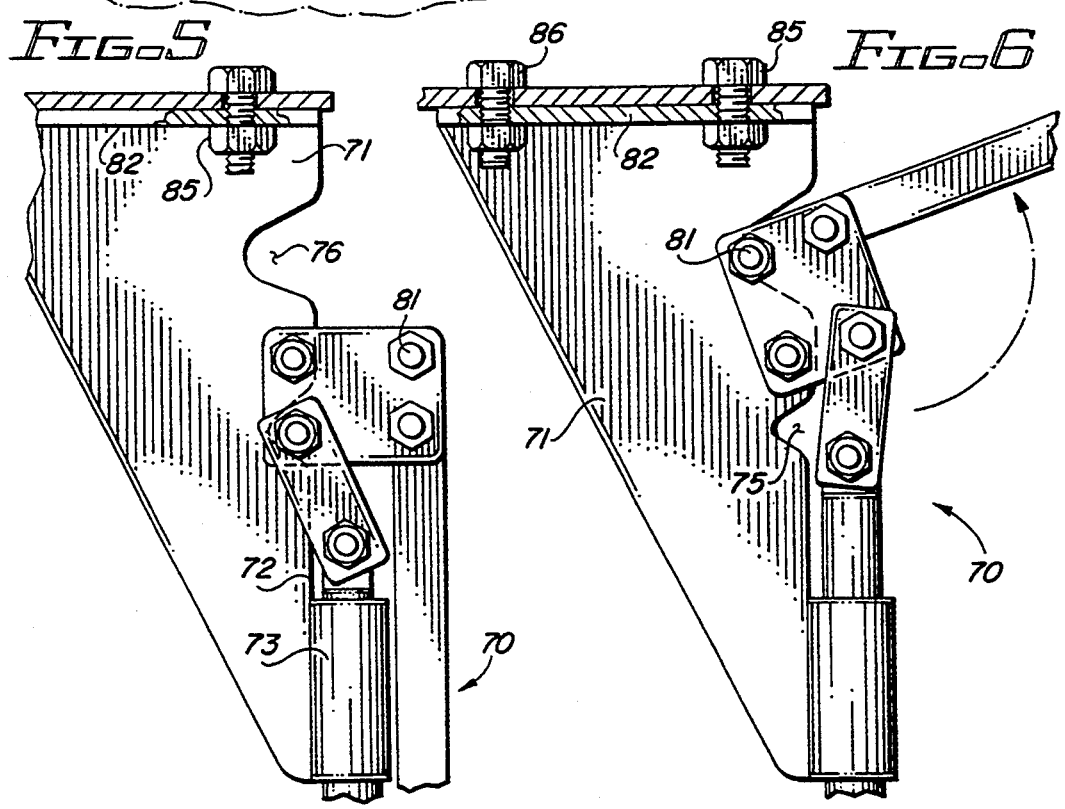

SELF-LOCKING BRAKE FOR PORTABLE STAND

BACKGROUND OF THE INVENTION

This invention relates to a brake for a portable stand and, in particular, to a brake which is rugged and self-locking yet can be easily set and released.

Stands, carts, and the like have long been provided with wheels to enable them to be moved without being lifted. Brakes have been provided, typically adjacent at least two wheels, for holding a stand in place. There are many types of brakes, all of which lower a foot to the floor and slightly lift the stand or at least bear a substantial fraction of the weight of the stand. Of the many types of brakes, this invention relates to brakes which use a combination of toggle joint and plunger, such as described in U.S. Pat. No. 2,712,366—Skupas—and in U.S. Pat. No. 3,735,841—Auriemma. In the Skupas patent, a pair of bell crank levers and links straddle a telescoping leg and are attached to each end of the leg. In the Auriemma patent, a compound lever extends a square tube held on three sides by a bracket attached to a cart.

For tool stands in particular, commercially available brakes are not strong enough to bear the weight of the tool, permitting the stand to rock or move when the tool is used. In a brake such as disclosed in the Auriemma patent, the tube is not held sufficiently securely to prevent motion when a force is applied at a large (relative to the height of the brake) distance from the floor. Heavy tools such as jointers and table saws make the problem more severe because their center of gravity is high.

Another problem is setting and releasing the brake. Brakes typically include an over-center mechanism in which the weight of the stand, and whatever is on the stand, bears down on the brake, locking the brake in an extended position. A toggle joint is typically designed for ease in setting the brake but not for ease in releasing the brake. While this assures that the brake is securely set, the brake is often difficult and inconvenient to release. The Auriemma patent discloses using an auxiliary lever for releasing the brake to solve this problem. While effective, the brake mechanism described in the Auriemma patent is complicated and expensive. The brake described in the Skupas patent relies on separate foot pedals for setting and releasing the brake and the pedals are inconveniently located close to the underside of the cart.

For tool stands which are frequently moved, by contractors for example, the brake mechanism must be rugged and easily operated. It is highly desirable that the brakes on one side of a stand be ganged and actuated simultaneously by a common bar or handle. In addition, the brakes should be actuated wherever a force is applied along the handle, i.e. it should not be necessary to apply a force at the center of the handle to actuate the brakes simultaneously.

The number of power tools and tool stands sold each year is considerable. Typically the tool stands do not include wheels or brakes. Presently available aftermarket kits are not rugged enough to withstand use or to hold the tool in place without rocking. There is thus a need for a brake kit for adding wheels and brakes to tool stands.

In view of the foregoing, it is therefore an object of the invention to provide a brake suitable for use on stands for heavy tools.

Another object of the invention is to provide a self-locking brake that is easily set and released.

A further object of the invention is to provide a brake that does not permit wobble or other motion of the brake when the brake is set.

Another object of the invention is to provide a brake kit which can be attached easily to existing portable stands.

A further object of the invention is to provide a brake which can be ganged with like brakes and actuated simultaneously.

SUMMARY OF THE INVENTION

The foregoing objects are achieved in the invention in which a brake for a portable stand includes a bracket for attaching the brake to the stand, a sleeve attached to one edge of the bracket, and a plunger movable within the sleeve. A toggle joint connected between the bracket and one end of the plunger has a pivot plate as one arm of the toggle joint and a handle attached to the pivot plate for extending and retracting the plunger. A foot attached to the free end of the plunger is either a friction pad or a caster and is attached to the plunger by a leveling screw. The edge of the bracket includes a recess for receiving the toggle joint in an over-center position. A kit for tool stands includes bracing for the legs of the tool stand and at least two brakes interconnected by a handle.

BRIEF DESCRIPTION OF THE DRAWINGS

A more complete understanding of the invention can be obtained by considering the following detailed description in conjunction with the accompanying drawings, in which:

FIG. 1 illustrates the legs of a portable stand having a pair of brakes attached to adjoining legs;

FIG. 2 is a side view of a brake constructed in accordance with the invention and in a set position;

FIG. 3 shows the brake of FIG. 2 in a released position;

FIG. 4 is a front view of a brake constructed in accordance with an alternative embodiment of the invention;

FIG. 5 is a side view of an alternative embodiment of a brake constructed in accordance with the invention;

FIG. 6 shows the brake of FIG. 5 in a released position; and

FIG. 7 is a perspective view of a portion of a wheel set constructed in accordance with the invention.

DETAILED DESCRIPTION OF THE INVENTION

FIG. 1 illustrates the legs of a portable stand such as would be used for supporting a table saw. Legs 11–14 are each a strip of sheet metal bent at ninety degrees along its length and angled to form a taper. Tools stands as sold by various hardware stores typically include just four legs and a horizonal platform for holding a tool. In order to move the tool, the tool and stand must be lifted and relocated.

In accordance with the invention, wheel set 18, described in more detail in conjunction with FIG. 7, is included in a kit with brakes to enable the tool stand to be moved about without having to lift the stand. A pair of brakes 20 and 21 are attached to adjoining legs one side of stand 10 for holding the stand in place. Brake 20 includes handle 23 for setting and releasing brake 20 and brake 21 includes handle 24 for setting and releasing brake 21. Handles 23 and 24 are interconnected by bar 25 for simultaneous actuation of brakes 20 and 21. Although not shown in FIG. 1, a second set of brakes can be attached to legs 11 and 14.

The construction of brakes 20 and 21 is shown in greater detail in FIGS. 2 and 3. FIG. 2 illustrates brake 20 in a set or extended position and FIG. 3 illustrates brake 20 in a retracted or released position. Brake 20 includes bracket 31 for attaching the brake to leg 12, e.g. by way of bolts 32 and 33. Bracket 31 is preferably angle iron having one flange connected to leg 12 and the other flange extending away from leg 12 and terminating in edge 34.

Sleeve 35 has its longitudinal axis parallel to edge 34 and sleeve 35 is attached along its length to edge 34, for example by welding. Plunger 36 is a rod extending from both ends of sleeve 35 and can move up and down within the sleeve. At lower end 37, foot 39 is attached to plunger 36 by leveling screw 41 which is threaded into the lower end of plunger 36. Foot 39 preferably includes friction pad 43 for engaging a floor or other support surface. The upper end of plunger 36 is attached to link 45 by bolt 46, about which link 45 can pivot. The free end of link 45 is attached to one corner of pivot plate 47 by bolt 48. Pivot plate 47 is a rectangular plate attached at a second corner to bracket 31 by bolt 49. Bolts 48 and 48 are at adjacent corners of rectangular pivot plate 47.

A toggle joint is a device having two links or arms jointed together end to end but not in line such that a force applied to the joint tending to straighten out the device will force the free ends of the links apart. It can be shown that when the links are in a nearly straight line, there is a considerable mechanical advantage; i.e. the force applied to the joint is considerably less than the force provided at the free ends of the joint.

In FIGS. 2 and 3, link 45 is one arm of a toggle joint and the side of pivot plate 47 between bolts 48 and 49 forms the other arm of the toggle joint. In brake 20, the toggle joint also includes an over-center mechanism by which the brake is held in an extended or set position by the weight of the stand. The over-center mechanism can be seen by comparing FIGS. 2 and 3. When brake 20 is set, bolt 48 is to the left of a line connecting the centers of bolts 46 and 49. When brake 20 is retracted, bolt 48 is to the right of the line connecting the centers of bolts 46 and 49. When brake 20 is set, bolt 48 rests in recess 51 in edge 34. Since plunger 36 is supporting part of the weight of the stand, the upward force on plunger 36 forces link 45 counter-clockwise against recess 51, locking the brake in the set position.

Handle 23 is attached to pivot plate 47 by bolts 53 and 54. Preferably, handle 23 is parallel with the side opposite the first side which formed one arm of the toggle joint. When brake 20 is set, handle 35 extends vertically downward from the toggle joint and provides a compact brake unit.

As illustrated in FIG. 3, brake 20 is readily released by rotating handle 23 counter-clockwise, forcing bolt 48 over center and raising plunger 36. Brake 20 is held in a released position by frictional engagement of plunger 36 with sleeve 35. The length of handle 23 is considerably greater than the distance between bolts 48 and 49, giving the user a further mechanical advantage in setting or releasing the brake.

FIG. 4 illustrates an alternative embodiment of the invention in which a caster is attached to the lower end of plunger 36. While a single pivot plate and link could be used to connect bracket 31 to the upper end of plunger 36, it is preferred to use a pair of pivot plates straddling edge 34 and handle 23, as shown in FIG. 4. Pivot plates 47a and 47b are located on each side of handle 23 and edge 31 (not shown). Similarly, link 45a and link 45b straddled pivot plates 47a and 47b and are connected to the upper end of plunger 36, which is preferably flattened to provide clearance for links 45a and 45b.

Instead of a separate brake and caster, caster 61 is attached to the lower end of plunger 36. In this embodiment of the invention, the stand is portable when plunger 36 is extended, lowering caster 61 below the end of leg 12, and the stand is fixed when plunger 36 is retracted.

As illustrated in FIG. 1, brake 20 is attached to a leg of a stand and the legs are tapered or splayed. To assure that plunger 36 is vertical, edge 34 is not parallel to the flanged attached to a leg but has a complementary taper to maintain plunger 36 vertical.

FIGS. 5 and 6 illustrate an alterative embodiment of the invention in which bracket 31 is adapted to be fastened to a horizontal support. Bracket 71 includes an elongated vertical flange having edge 72, to which sleeve 73 is attached. Edge 72 includes recess 75, which corresponds to recess 51 in FIG. 3, and recess 76, which provides clearance for bolt 81 when brake 70 is retracted. Bracket 71 includes a second flange 82 attached to a horizontal support by bolt 85 and 86. The operation of brake 70 is the same as the operation of brake 20.

FIG. 7 illustrates a portion of the wheel set used in a kit including brakes constructed in accordance with the invention. Since a portable stand is likely to be moved a great deal, four braces are included in the kit for stiffening the legs. The intersection of two leg braces is shown in FIG. 7 in which brace 91 is attached to brace 92 and caster 93 by four bolts. The braces are attached to both sides of a leg by bolts through holes such as hole 96. Each leg brace is a predetermined length of sheet metal bent to form two sides having an included angle corresponding to the taper, if any, of legs. The taper or splay is represented in FIG. 7 by dot-dash lines 97 and 98. When braced, the legs of the portable stand are considerably stiffer, preventing bending or twisting of the legs as the stand is moved about. Two casters and two straight wheels are included in the kit, one wheel for each corner formed by the braces. The casters are attached at adjoining corners. Four casters could be used, but this might make the stand difficult for one person to steer.

The wheel set and brakes provide a secure, sturdy, portable stand having brakes that are easily set and released. Plunger 36 fits closely within sleeve 35, preventing wobble.

Having thus described the invention, it will be apparent to those of skill in the art that various modifications can be made within the scope of the invention. For example, although described in a preferred embodiment as a brake for a portable tool stand, a brake constructed in accordance with the invention can be used for other applications such as appliances or light trailers. The bracket need not be a separate element but can be part of a stand having a built-in brake. The shape of the handle and bar can be modified to suit the application or aesthetics.

I claim:

1. A brake for a portable stand, said brake comprising:
   a bracket for attachment to said stand, said bracket having an edge;
   a sleeve having a predetermined length and attached to said edge along said length;
   a plunger, longer than said sleeve and fitting within said sleeve, said plunger having a first end and a foot attached at said first end;
   a toggle joint including a first arm and a second arm connected at a pivot joint, wherein said first arm is connected to a second end of said plunger and said second arm is attached to said bracket; and
   a handle attached to one of said first and second arms for extending and retracting said plunger by moving said first and second arms about said pivot joint;
   wherein said edge includes a recess for receiving said pivot joint in an over-center position of said toggle joint.

2. The brake as set forth in claim 1 wherein said foot is attached to said plunger by a leveling screw.

3. The brake as set forth in claim 1 wherein said foot includes a caster.

4. The brake as set forth in claim 1 wherein said bracket is an angle iron having a first side attached to said sleeve and a second side adapted to be attached to said stand.

5. A brake for a portable stand, said brake comprising:
   a bracket for attachment to said stand, said bracket having an edge;
   a sleeve having a predetermined length and attached to said edge along said length;
   a plunger, longer than said sleeve and fitting within said sleeve, said plunger having a first end and a foot attached at said first end;
   a toggle joint including a first arm and a second arm connected at a pivot joint, wherein said first arm is connected to a second end of said plunger and said second arm is attached to said bracket; and
   a handle attached to one of said first and second arms for extending and retracting said plunger by moving said first and second arms about said pivot joint;
   wherein said second arm is a rectangular plate having said pivot joint at a first corner of said plate and said bracket attached at a second corner of said plate.

6. The brake as set forth in claim 5 wherein said first corner and said second corner are at each end of a first side of said plate and said handle is attached to said plate along a second side of said plate, opposite said first side.

7. A portable stand comprising:
   at least two legs;
   a pair of brakes;
   a pair of brackets, wherein each bracket is an angle iron having one side attached to a brake and another side attached to a leg;
   wherein each of said brakes includes:
      a sleeve having a predetermined length and attached to said stand along said length;
      a toggle joint;
      a plunger
         (i) longer than said sleeve,
         (ii) fitting within said sleeve,
         (iii) having a first end outside said sleeve,
         (iv) having a foot attached to said first end, and
         (v) having a second end outside said sleeve, wherein said toggle joint is connected between said second end and said stand;
   wherein said brackets each have an edge on said one side and a sleeve attached to said edge;
   wherein said legs are tapered and said brackets have a complementary taper along said one edge;
   wherein said stand further includes a handle interconnecting the toggle joints of said brakes for simultaneously moving said plungers within said sleeves.

8. A portable stand comprising:
   at least two legs;
   pair of brakes;
   a pair of brackets, wherein each bracket is an angle iron having one side attached to a brake and another side attached to a leg;
   wherein each of said brakes includes:
      a sleeve having a predetermined length and attached to said stand along said length;
      a toggle joint;
      a plunger
         (i) longer than said sleeve,
         (ii) fitting within said sleeve,
         (iii) having a first end outside said sleeve,
         (iv) having a foot attached to said first end, and
         (v) having a second end outside said sleeve, wherein said toggle joint is connected between said second end and said stand;
   wherein said brackets each have an edge on said one side and a sleeve attached to said edge;
   wherein said stand further includes a handle interconnecting the toggle joints of said brakes for simultaneously moving said plungers within said sleeves;
   wherein each edge includes a recess for receiving a pivot joint in an over-center position.

9. A kit for adding brakes to a portable stand having at least two legs, said kit comprising:
   a brace for said legs;
   at least two brakes for attachment to said legs, wherein each of said brakes includes:
      a bracket for attachment to one of said legs, said bracket having an edge;
      a sleeve having a predetermined length and attached to said edge along said length;
      a plunger, longer than said sleeve and fitting within said sleeve, said plunger having a first end and a foot attached at said first end;
      a toggle joint including a first arm and a second arm connected at a pivot joint, wherein said first arm is connected to a second end of said plunger and said second arm is attached to said bracket; and
   a handle for interconnecting the toggle joints of said brakes for simultaneously moving said plungers within said sleeves,
   wherein said edge includes a recess for receiving said pivot joint in an over-center position of said toggle joint.

10. The kit as set forth in claim 9 and further comprising:
    at least two casters for attachment to said legs.

11. A kit for adding brakes to a portable stand having at least two legs, said kit comprising:
    a brace for said legs;
    at least two brakes for attachment to said legs, wherein each of said brakes includes:
       a bracket for attachment to one of said legs, said bracket having an edge;

a sleeve having a predetermined length and attached to said edge along said length;

a plunger, longer than said sleeve and fitting within said sleeve, said plunger having a first end and a foot attached at said first end;

a toggle joint including a first arm and a second arm connected at a pivot joint, wherein said first arm is connected to a second end of said plunger and said second arm is attached to said bracket; and a handle for interconnecting the toggle joints of said brakes for simultaneously moving said plungers within said sleeves;

wherein each said second arm is a rectangular plate having said pivot joint at a first corner of said plate, said bracket attached at a second corner of said plate, said first corner and said second corner are at each end of a first side of said plate, and said handle is attached to each plate along a second side of said plate, opposite said first side.

* * * * *